Jan. 30, 1934.  A. A. KNEE  1,945,320
CHECK TESTING MEANS FOR CHECK CONTROLLED APPARATUS
Filed May 6, 1931    7 Sheets-Sheet 3

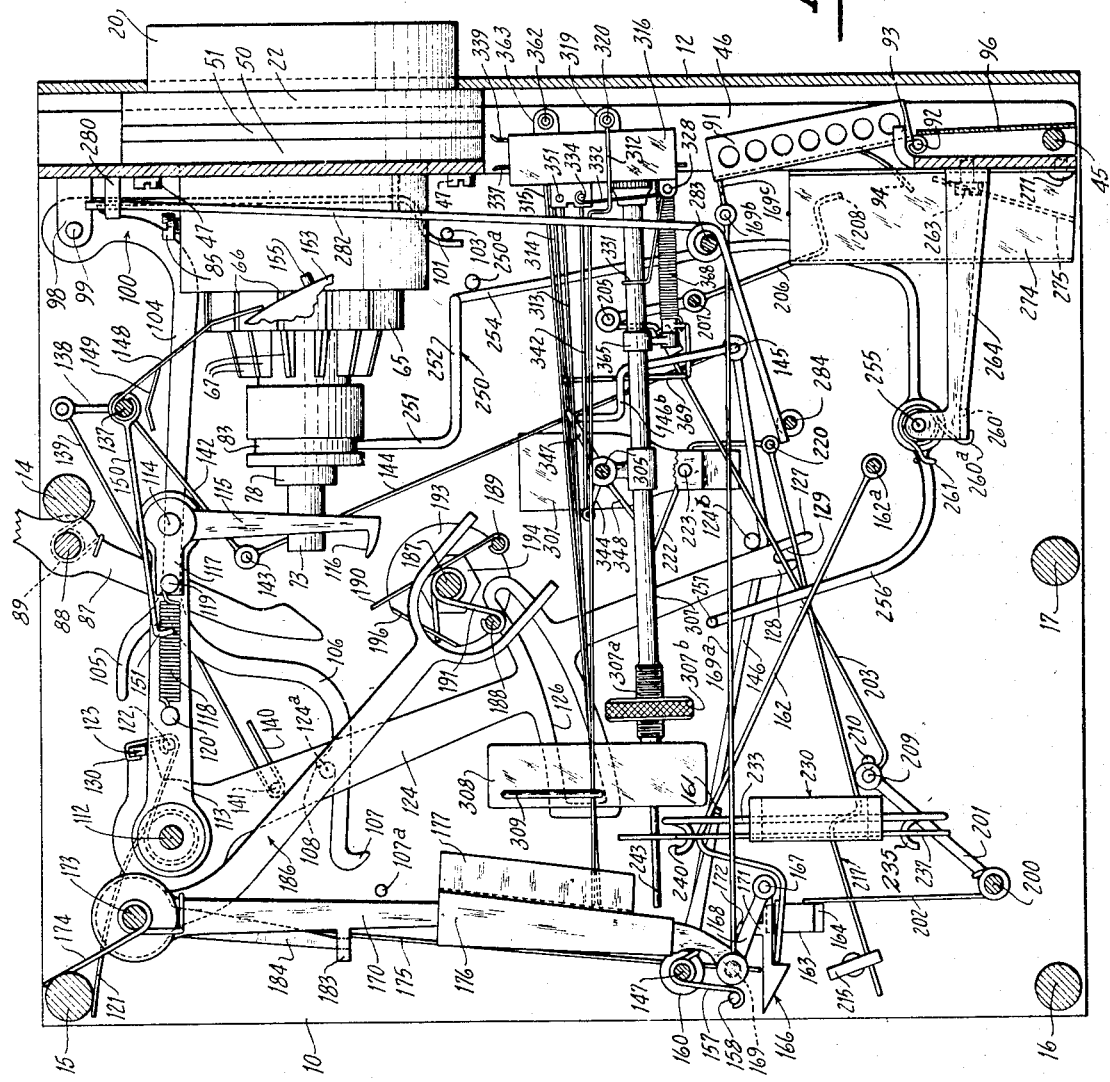

A. A. KNEE.
INVENTOR.

BY

ATTORNEY.

Jan. 30, 1934.  A. A. KNEE  1,945,320
CHECK TESTING MEANS FOR CHECK CONTROLLED APPARATUS
Filed May 6, 1931  7 Sheets-Sheet 4

A. A. KNEE.
INVENTOR.

BY
ATTORNEY.

Jan. 30, 1934.  A. A. KNEE  1,945,320
CHECK TESTING MEANS FOR CHECK CONTROLLED APPARATUS
Filed May 6, 1931  7 Sheets-Sheet 5
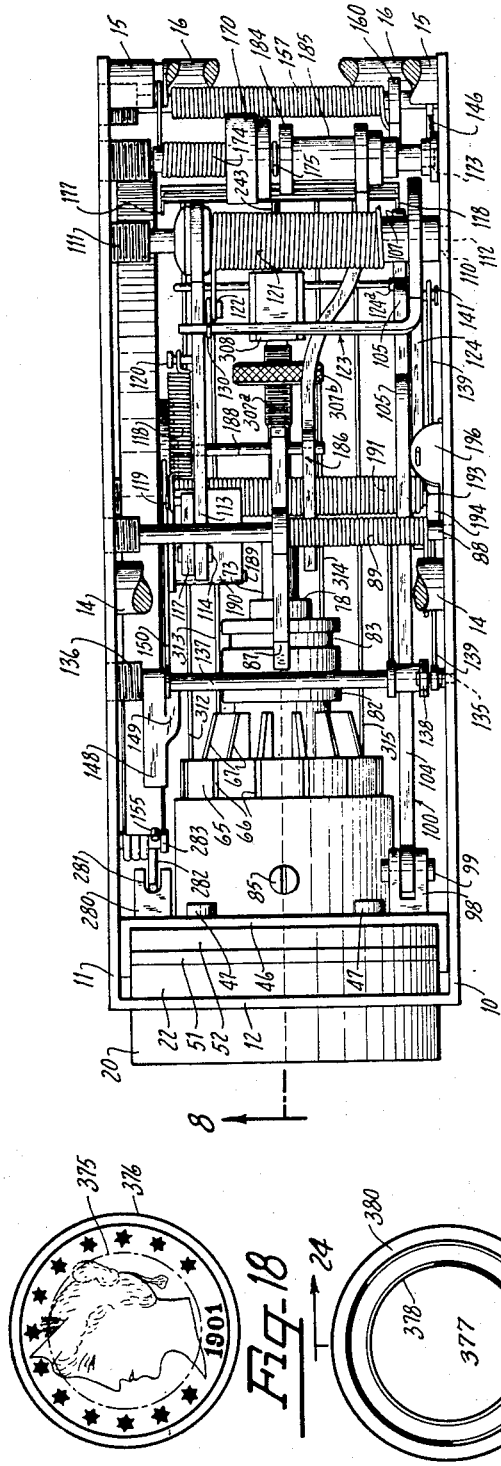
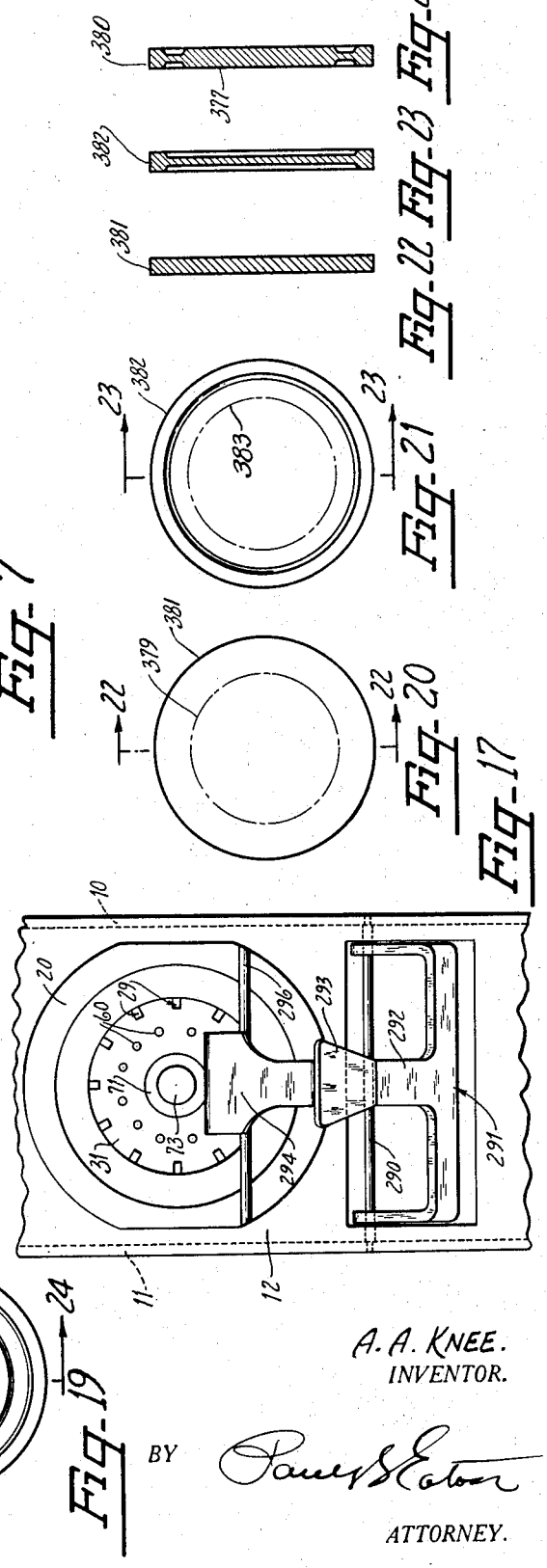
A. A. KNEE.
INVENTOR.
BY *Paul S. Eaton*
ATTORNEY.

Jan. 30, 1934.  A. A. KNEE  1,945,320
CHECK TESTING MEANS FOR CHECK CONTROLLED APPARATUS
Filed May 6, 1931   7 Sheets-Sheet 6
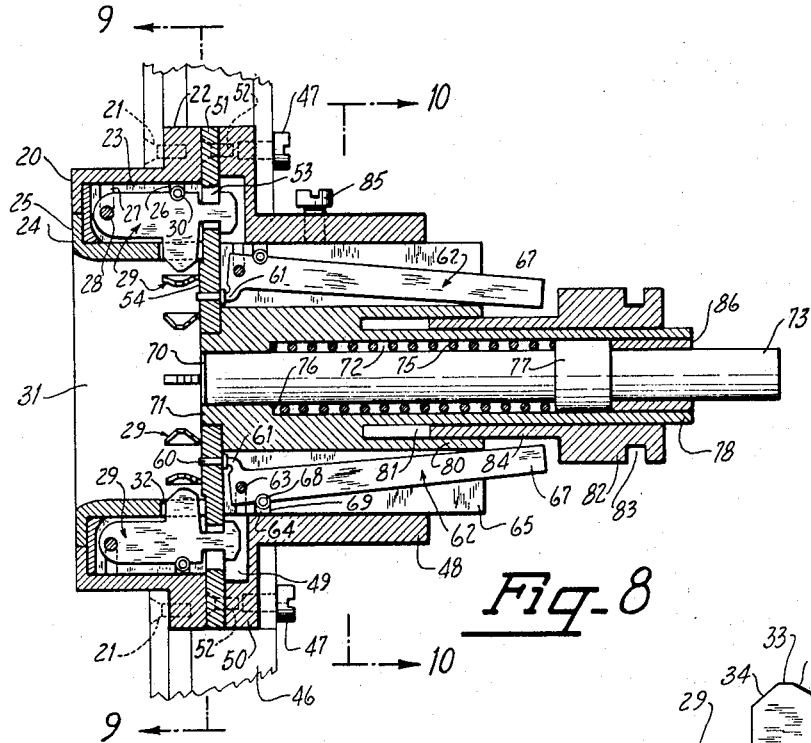
Fig. 8
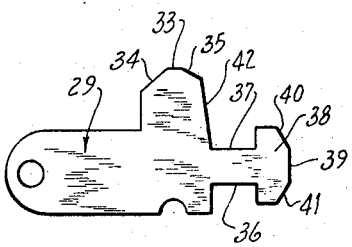
Fig. 16
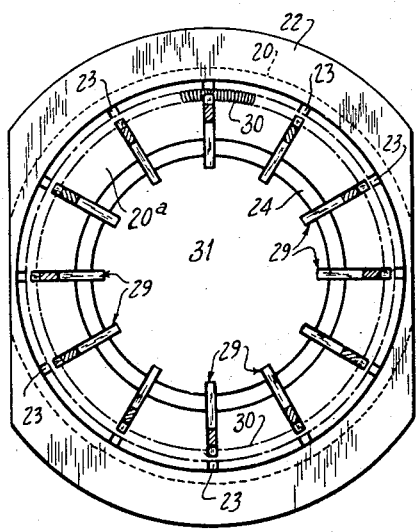
Fig. 9
Fig. 10
A. A. KNEE.
INVENTOR.
BY *James S Eaton*
ATTORNEY.

Jan. 30, 1934.  A. A. KNEE  1,945,320
CHECK TESTING MEANS FOR CHECK CONTROLLED APPARATUS
Filed May 6, 1931  7 Sheets-Sheet 7
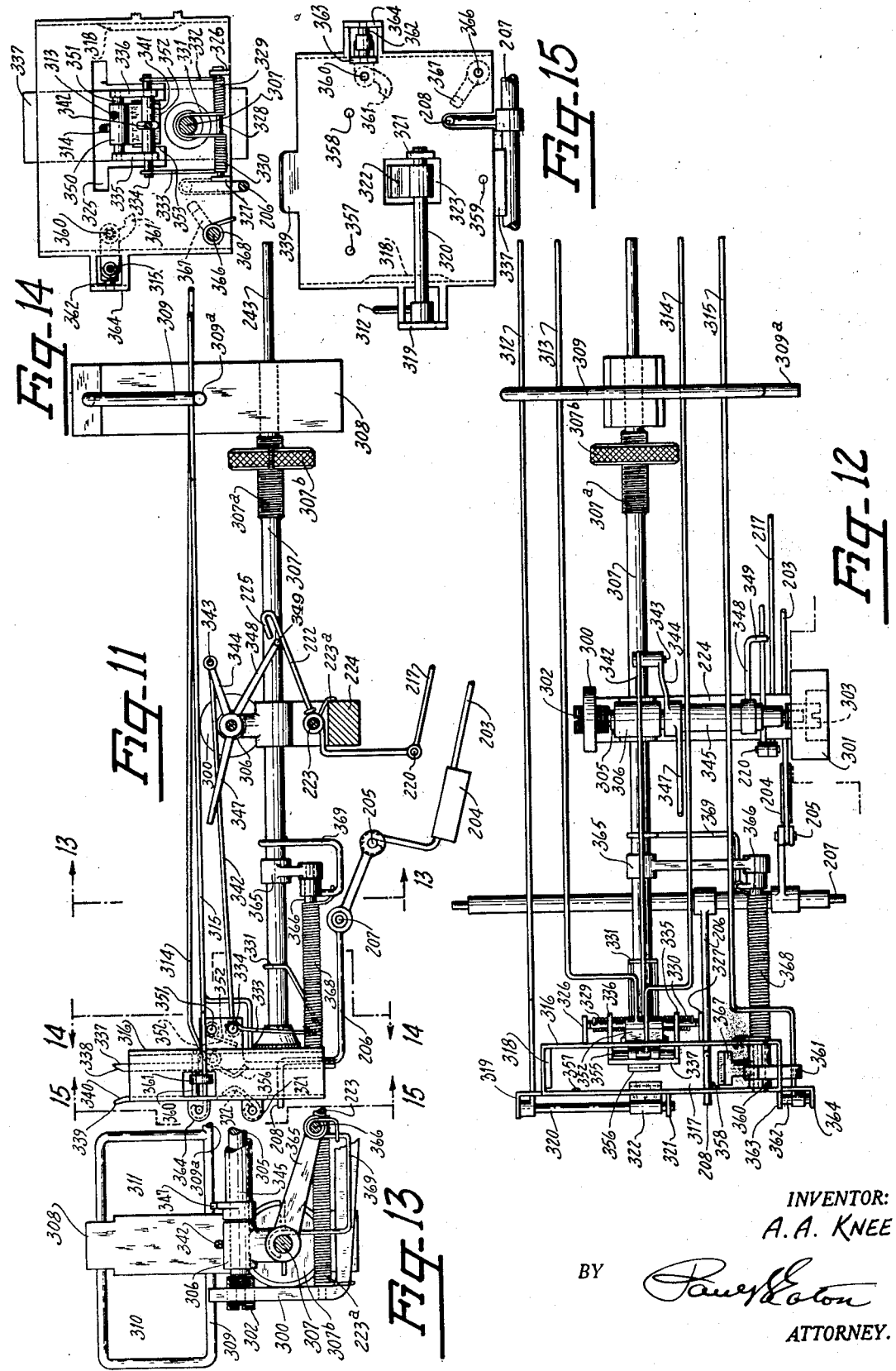
INVENTOR:
A. A. KNEE.
BY Paul Eaton
ATTORNEY.

Patented Jan. 30, 1934

1,945,320

UNITED STATES PATENT OFFICE 1,945,320

CHECK TESTING MEANS FOR CHECK CONTROLLED APPARATUS

Aaron A. Knee, Charlotte, N. C., assignor to Vanak Corporation, Charlotte, N. C., a corporation of North Carolina Application May 6, 1931. Serial No. 535,494

15 Claims. (Cl. 194—97)

This invention relates to a fraud preventive device in which means are provided for subjecting a check or coin to a plurality of tests before the coin is accepted for delivery into the check or coin controlled machine with which it is adapted to be associated.

An object of this invention is to provide a fraud preventive device having a check entrance adapted to impart to a check or coin inserted therein, a plurality of tests before the check is allowed to open the check entrance and also a test is given the check or coin for operating other means for controlling later testing devices into which the check or coin is delivered after passing through the entrance.

Another object of this invention is to provide a check entrance in which means are provided for measuring the peripheral thickness of the check or coin and also an entrance requiring a check or coin which is of a given circular dimension and which dimension must be completely circular and which check must also have a given peripheral thickness in order to open the check entrance. The check or coin must also have a given circumference and this circumference must be circular in order to allow the check entrance which is normally in closed position to be moved by pressure on an inserted check complying with the proper peripheral thickness and being circular and being of a given circumference to allow the pressure exerted on the check to move the entrance to open position.

Also associated with said entrance are certain feeler members adapted to engage the side surface of the check or coin and to be operated thereby to determine as to whether or not certain means may be placed in proper position for releasing the deflector operating means for disposing of the coin or check after it passes through the entrance.

Another object of this invention is to provide a fraud preventive device for a check controlled apparatus having a suitable check entrance as above outlined and from said check entrance the check or coin is adapted to be delivered to another testing mechanism in the form of a balancing means which has associated therewith a stabilizing mechanism adapted to quickly stabilize the balancing beam after it has received the check or coin.

The stabilizer operates to quickly stabilize the balancing beam so as to cause a portion thereof to register with another moving portion in the machine properly to allow the deflector mechanism of the machine to operate to dispose of the check by transferring it into the check controlled apparatus provided it also passes certain other tests which are imparted to the check or coin in the balancing beam because said balancing beam is also provided with means for measuring the thickness of the central portion of the check regardless of the peripheral thickness.

Also means are associated with the receiving end of said balancing beam for measuring the peripheral thickness of the check, and also other means are provided in the balancing beam for measuring the diameter of the check and means are associated with all of said thickness and diameter testing means adapted to cooperate with a deflector operating mechanism so that all of the thickness and diameter reading means in the balancing beam must be properly positioned in order to allow the deflector operating mechanism to operate to deflect the check or coin into the check controlled apparatus.

Another object of this invention is to provide means for simultaneously weighing and measuring a check or coin.

Another object is to provide a plurality of measuring devices for a check or coin and for magnifying said measurements, with means controlled by said magnifications for determining the disposition of the check or coin.

Some of the objects of the invention having been stated, other objects will appear as the description proceeds when taken in connection with the accompanying drawings, in which—

Figure 2 is a reverse side elevation from Figure 1 and likewise having the side plate removed with certain portions in cross section;

Figure 7 is a top plan view;

Figure 8 is a longitudinal sectional view taken along the line 8 in Figure 7;

Figure 9 is a transverse cross sectional view taken along the line 9—9 in Figure 8;

Figure 10 is a transverse cross sectional view taken along the line 10—10 in Figure 8;

Figure 11 is a side elevation on an enlarged scale of the balancing mechanism and its associated parts;

Figure 1:
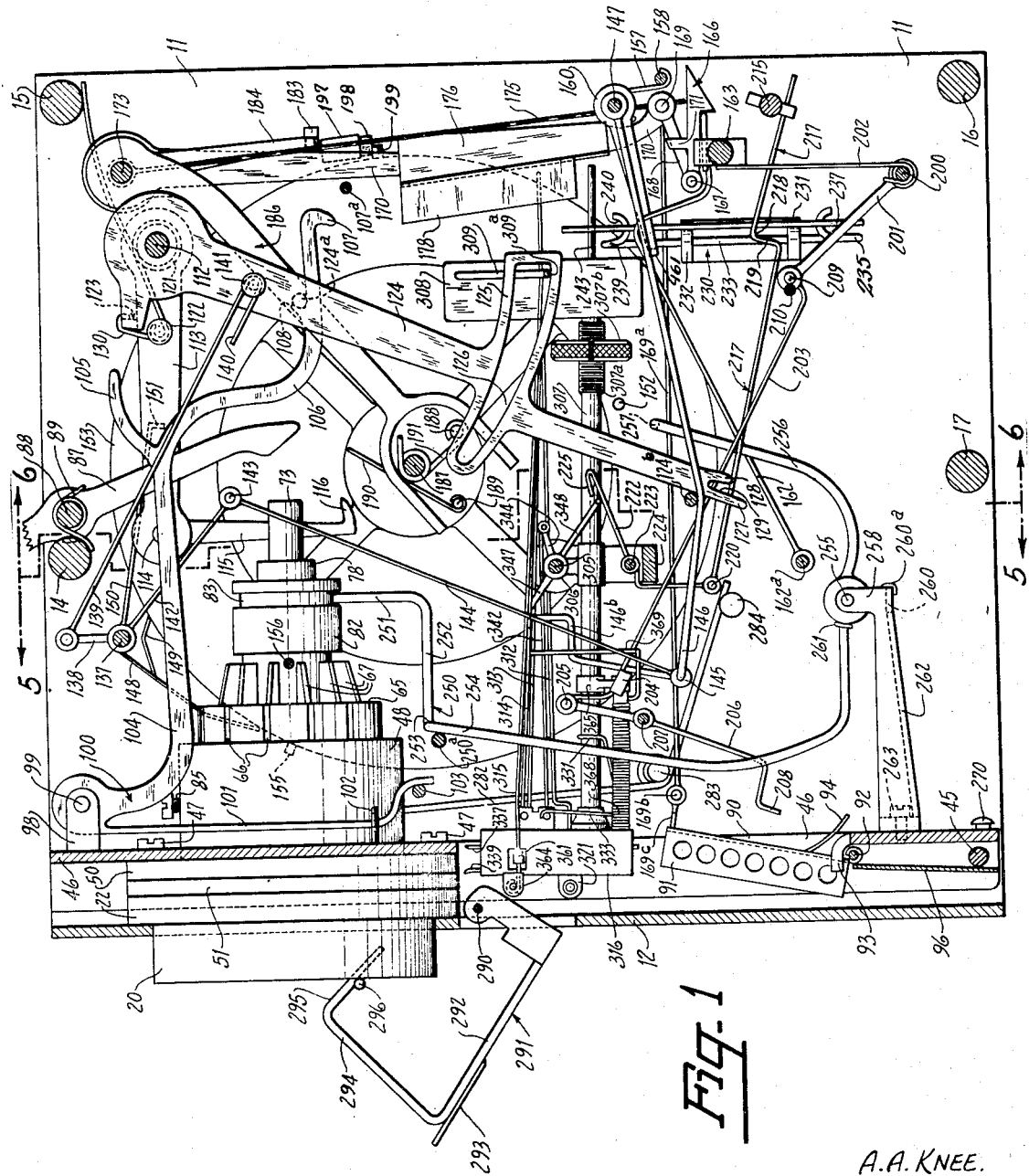
Figure 1 is a side elevation of the device with the side plate removed and with certain portions in cross section.

Figure 12 is a top plan view of Figure 11;
Figure 13 is a cross sectional view taken along the line 13—13 in Figure 11;
Figure 14 is a cross sectional view taken along the line 14—14 in Figure 11;
Figure 15 is an end view taken along the line 15—15 in Figure 11;
Figure 16 is an enlarged side elevation of one of the dogs for locking the closing means for the entrance in closed position;
Figure 17 is a front elevation of the entrance and showing the means for applying pressure on an inserted check;
Figure 18 is a side elevation of one side of a coin;
Figure 19 is a side elevation of a type of check;
Figure 20 is a side elevation of another type of check;
Figure 21 is a side elevation of still another type of check;
Figure 22 is a cross-sectional view taken along the line 22—22 in Figure 20;
Figure 23 is a cross-sectional view taken along line 23—23 in Figure 21;
Figure 24 is a cross-sectional view taken along line 24—24 in Figure 19.

Referring more specifically to the drawings, the numerals 10 and 11 indicate the side plates of the mechanism, and a front plate designated by 12. These side plates 10 and 11 are secured to each other by a plurality of members such as spacer blocks 14, 15, 16 and 17. These spacer blocks are means for securing the two plates together and are merely conventional, and any suitable means for fastening the side plates together may be provided. The end plate 12 may be made integral with the side plates 10 and 11, if desired, or separate, as any suitable casing can be provided for supporting the mechanism, and of course, it is understood that a suitable casing in addition to the sidewalls may be provided.

End plate 12 has a suitable opening therein in which a circular member 20 is secured by any suitable means such as screws 21 which are embedded in a flange 22 extending from the circumference of member 20. Within member 20 is a member 24 which has a flange 25 therearound, fitting into member 20 so as to present a flat surface on the outside thereof. Between members 20 and 24 there is a ring member 20a having circumferential grooves 26 and 27 therein. Member 20a has a plurality of longitudinally disposed slots 23 therein.

Pivotally mounted on a ring 28 disposed in groove 27 is a plurality of dog members 29 which have a notch in one surface thereof which is adapted to be engaged by an endless tension spring 30 to normally press the free ends of these dogs toward each other, as these dogs are concentric with relation to the center of check entrance 31 provided in member 24. Member 24 has for each dog a slot 32 therein through which projects a portion 33 of the dog and this portion 33 has an inwardly sloping surface 34, and also another sloping surface 35. These dogs 29 are loosely mounted in slots 23.

Each of the dogs 29 has opposed notches 36 and 37, and an enlarged end 38 having the flat end portion 39 and the sloping corner portions 40 and 41. The entrance 31 is made to conform to admit a coin or check of a certain size and when the check is admitted the dogs are pressed apart from each other on account of the check or coin being pressed against the sloping portions 34, and after passing the flat portion 33 the other sloping portions 35 hold the coin and press it inwardly against the closure means which will be presently described and when the closure means are moved slightly, the check or coin will be held in the entrance by the surfaces 42 of the dogs.

Pivotally mounted between the side plates 10 and 11 on the shaft 45, is a member 46 which projects upwardly and has secured therein by any suitable means, such as screws 47, a shell member 48 having a circular cavity 49 in the front face thereof, and secured to enlarged portion 50 of the shell member 48 is a plate member 51 which is secured by any suitable means such as set screws 52, said plate member forming a closure for the coin entrance when in normal closed position. This plate member 51 has apertures 53 there being an aperture for each of the dogs 29. This plate member also has a slightly raised circular surface portion indicated by reference character 54. The outer periphery of this raised portion is in alinement with the inner surface of entrance 31, and the purpose of this raised portion is to prevent a very thin oversized disk or washer or other counterfeit check or coin from being deposited in the entrance and slightly forced inward and lodged behind the surfaces 42 of dogs 29. This provision of the raised circular portion allows a space between the surfaces 42 of dog members 29 and the disk 51 into which a thin check cannot be inserted. This is necessary to allow pivotal movement of dogs 29 upon the insertion of a check or coin before it reaches the disk 51 for opening the closure means.

Within the raised portion 54 of disk 51, a plurality of pins 60 are concentrically and slidably mounted in said disk and project slightly beyond the plane surface of raised portion 54. The other ends of these pins are headed and are adapted to have engagement at all times with the shorter leg portion 61 of bell crank levers 62 which are pivotally mounted on a ring 63 which ring 63 is held in a circumferential groove 64 of circular member 65. This member 65 has a plurality of longitudinally disposed slots 66 therein, there being one slot for each bell crank lever 62 and in which the bell crank levers are mounted. The longer leg of each of bell crank levers 62 is indicated by reference character 67. An endless tension spring 68 is mounted in a circumferential groove 69 in member 65, the purpose of this being to normally press in a notch in the outer edge of each of the bell crank levers 62 to hold them normally in the position shown in Figure 8. In this position, it is seen that the shorter legs of the bell crank lever are held against the sliding pins 60 at all times.

Member 65 has a circular bore 70 centrally disposed, and surrounding this bore is a portion 71 which projects through a hole in plate member 51 and plate member 51 is secured by a tight fit, or any other suitable means on this portion 71, thus uniting members 65 and 51 for unitary operation. This member 65 has an enlarged bore 72, and a shaft 73 penetrates this enlarged bore and also the smaller bore 70, and in the enlarged bore and surrounding shaft 73 is a compression spring 75, one end of which is adapted to press against shoulder 76, and the other end of which fits against a boss 77 on shaft 73.

Shaft 73 projects to the exterior of member 65, and this exterior portion is an elongated circular portion indicated by reference character 78. The elongated portion 78 and a similar shorter elongated portion 80 concentrically disposed with relation to shaft 73 leave a space 81 between portions 78 and 80 and slidably mounted on elongated portion 78 is a member 82 which has a circumferential groove 83 therein, and a restricted circular portion 84 which fits into the circular cavity 81 just described. Members 48 and 65 are secured to each other by any suitable means such as a set screw 85.

By means of a pressed fit, or any other suitable means, a sleeve 86 is disposed within the bore 72 behind boss 77 to prevent compression spring 75 from pressing the shaft 73 further to the right as shown in Figure 8. Ejector lever 87 is pivoted on pin 88 and is normally held away from shaft 73 by means of torsion spring 89. This ejector lever is used to eject a check or coin from the entrance when the check fails to gain admission.

Member 46 has an opening 90 therein in which a deflector 91 is adapted to have operation, said deflector being pivotally mounted on a transversely disposed pin 92, and a projection 93 is bent from portion 46 on each side of the deflector to form guides for said deflector to guide the same in its swinging movement. Deflector 91 has a tongue 94 projecting from the rear surface thereof for deflecting checks which are genuine into the check controlled apparatus in association with the rear surface of deflector 91. Another purpose of projection 94 is to prevent the check or coin from engaging the in-turned portion 93 which has previously been described.

Between the sidewalls of member 46 and at the lower end thereof, there is secured the vane 96, which prevents rejected checks from striking the shaft 45.

Member 46, at the upper end thereof, has the forked member 98 projecting therefrom, and in the forks of said member a pin 99 is mounted, on which is pivotally mounted a member 100 which has a leaf spring 101 integral therewith which projects downwardly and passes through a loop member 102 secured to member 46, and then this leaf spring projects rearwardly and downwardly behind a pin 103, and as will be later explained, the leaf spring engages only member 102 or member 103 at predetermined times, as it does not engage both at any one time.

Member 100 has an irregularly shaped portion 104 which projects rearwardly and has an upwardly and rearwardly projecting tongue 105, and a downwardly and rearwardly projecting tongue 106 which has a hook 107 on the rear portion thereof, and on the upper portion thereof, a projection 108 is provided, the purpose of hook 107 and projection 108 will be presently described. Suitable bearings 110 and 111 are mounted in the sidewall portions 10 and 11 and in these bearings, the end portions of a shaft 112 are mounted, said shaft 112 having integral therewith an arm 113 which has pivotally mounted in the free end thereof as at 114, a bell crank lever 115 which has a hook 116 on the lower end thereof, and the shorter portion of this bell crank lever is indicated by reference character 117 and has a tension spring 118 secured at 119 and to pin 120. The purpose of tension spring 118 is to hold the hook 116 in the position shown normally, to cause hook 116 to engage vane 190.

The shaft 112 has a torsion spring 121 therearound, one end of the torsion spring being secured to arm 113 as at 122. The other end of said torsion spring fits beneath spacer 15. After the torsion spring, just described, has been placed in position, an L-shaped member 123 is fitted onto the shaft 112, and this L-shaped member projects laterally above member 113. This member 123 has integral therewith a downwardly projecting lever 124, which lever 124 has a portion 125 with a slot 126 therein, and the lower end of this member has the spaced projections 127 and 128 forming a slot 129 therebetween. The forward movement of member 124 is limited by a fixed pin 124b mounted in sidewall 10. Members 113 and 123 are tied to each other by means of a hook 130.

Rotatably secured in bearings 135, and 136 in sidewall portions 11 and 10 respectively is a shaft 137 on which, close to one end thereof, is fixedly secured an extension 138 which has pivotally secured to the free end thereof a connecting rod 139 which has a hook 140 in the other end thereof which loosely fits over a pin 141 in portion 124 of member 123. Integral with member 138 is an arm 142 which has pivotally secured in the free end thereof as at 143 a connecting rod 144 which is pivotally secured as at 145 to a horizontal portion 146a of coin dump member 146 which coin dump member projects outwardly away from the entrance and is fixedly secured to a rotatable shaft 147 which is rotatably mounted between the sidewalls 10 and 11.

Loosely mounted on shaft 137 is a member 148 which has a projection extending from one side thereof, indicated by reference character 149 which projection 149 is in the path of member 150. Member 150 has a hook 151 on the free end thereof adapted to be engaged by pin 152 in wheel 153 when wheel 153 is partially rotated which will be presently described. Member 148 is raised upwardly out of the path of pin 155 when member 150 drops to a point where it engages projection 149 as member 150 is fixedly secured on shaft 137; whereas, member 148 and its projection 149 is loosely secured thereon. The movement of member 142 is limited by a pin 156 mounted in sidewall 10. Member 146 is fixedly secured on shaft 147. A torsion spring 157 is secured at one end of member 146 and surrounds shaft 147, and the other end of this torsion spring has its end secured to a pin 158 in sidewall 11. This spring 157 normally forces 146 on 147 in a clockwise direction in Figure 1.

Hook 107 engages pin 107a when the entrance is opened on account of leaf spring 101 being allowed to press against member 46 at the base of loop 102, and when the closing means for the entrance, namely member 46, moves to closing position, pin 103 engages leaf spring 101 and knocks hook 107 off of pin 107a.

When the entrance is opened notch 108 on member 106 engages a pin 124a on member 124 and moves member 124 backwards and causes the lower end thereof to engage pin 209 and move it backwards and also causes hook 116 to engage lower edge of vane 190 on wheel 153.

Figure 6:
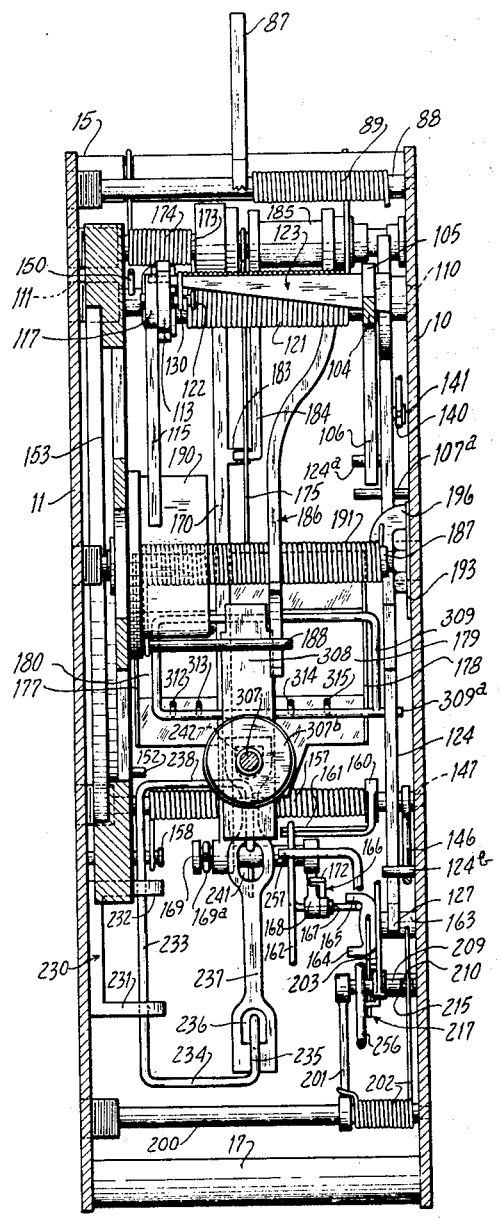
Figure 6 is a vertical cross sectional view taken along the line 6—6 in Figure 1.

Integral with shaft 147 is an arm projecting toward the entrance side of the device and indicated by reference character 160, and this has a laterally and inwardly projecting portion 161 (Figure 6) which occupies a position beneath member 162 which member is fixedly secured to a shaft 162a which is rotatably mounted in the sidewalls of the device. Immediately after passing the laterally projecting portion 161 of member 160, the rod 162 projects downwardly and then rearwardly, and then laterally toward sidewall 10 and then forwardly toward the entrance, forming a U-shaped portion having movement in a guide 163 which guide has upper and lower projections 164 and 165 to confine this leg member in position, said guide being fixedly secured to 160 sidewall 10. This U-shaped portion just described is adapted to have engagement with a dog 166 which is pivotally mounted as at 167 on an arm 168 which is rigid with pin 169 which pin is fixedly secured in the lower end of swinging member 170.

Connected to shaft 169 is a connecting rod 169a which projects forwardly to near the front portion of the machine where it is connected to the upper end of deflector 91 for operating the same, being connected to deflector by means of a pivot point 169b, formed on the end of an arm 169c integral with the upper end of deflector 91.

Dog 166 has an upwardly projecting portion 171 which has a laterally projecting portion 172 (Fig. 6) which rests on top of member 168 to limit the downward movement of dog 166.

Figure 4:
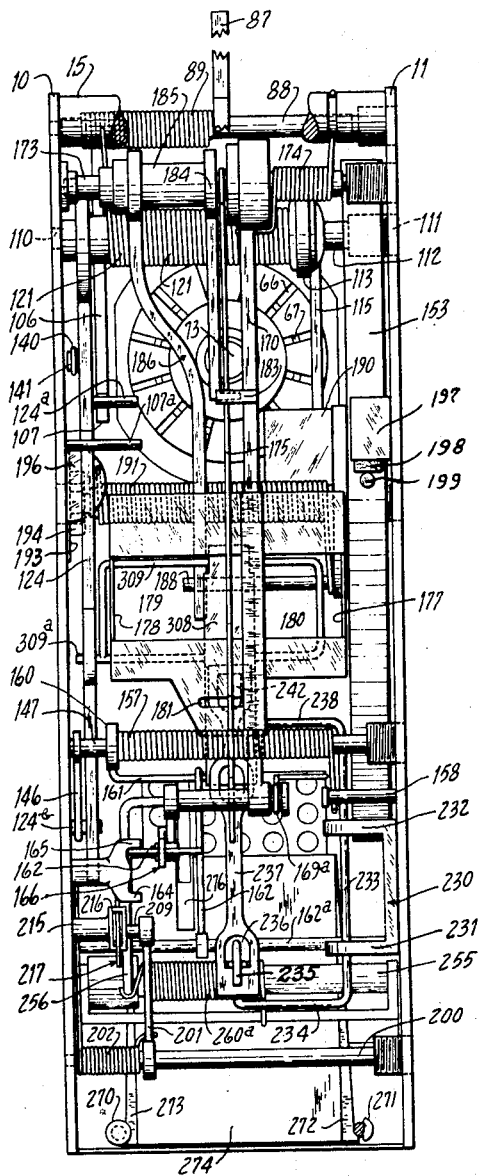
Figure 4 is a rear elevation of the device.

Member 170 at its upper end, is fixedly mounted on a shaft 173 which is rotatably mounted in bearings in the sidewalls 10 and 11 at its ends, and this member 170 is normally pressed backward against shaft 147 by means of a torsion spring 174 having one end thereof secured to the upper end of member 170, and the other end thereof hooked over the spacer block 15. A leaf spring 175 is loosely mounted on shaft 173 and projects downwardly alongside member 170 and has its lower end loosely mounted in a hole penetrating shaft 169. Member 170 also has mounted thereon a vane 176 which has vertically disposed laterally projecting side portions 177 and 178 and also has openings 179 and 180 (Figure 4), the smaller opening being designated by 180 and the larger opening by reference character 179. Also in the lower part of this vane is a transversely disposed elongated slot 181. These openings and slots are adapted to allow relative movement between member 170 and rods 312, 313, 314, 315 connected with the feeler mechanism in the balancing means which will be later described, and also pin 243 for lifting the stabilizer 237.

Member 170 has a rearwardly and laterally projecting portion 183 thereon which engages the lower end of member 184 which member 184 has the upper end thereof surrounding shaft 173 and this member 184 is fixedly secured to a collar 185 loosely mounted on said shaft and fixedly secured on said collar is a forwardly and downwardly projecting member 186 which is forked at its free end and passes on opposite sides of shaft 187, which shaft is the shaft on which wheel 153 is fixedly mounted. Said shaft has movement in bearings in the sidewall portions 10 and 11.

Wheel 153 has a pin 188 in the hub portion thereof which projects within the forked portion of member 186. The hub portion of wheel 153 also has fixedly mounted therein a pin 189 on which is fixedly secured a vane 190 which is adapted to guide the lower end 116 of member 115 to cause the hook 116 to engage said pin when the entrance is opened to move the wheel a partial revolution when pressure is applied to the check. The purpose of this wheel and the hook 116 engaging vane for giving partial rotation to the wheel, is for the wheel to act as a governor and to slow up the actuation of the mechanism to the desired time limit.

Mounted around shaft 187 is a torsion spring 191 which torsion spring has one end thereof secured to pin 188, and the other end thereof is secured to one of the sidewalls of the machine for returning the wheel 153 to normal position after insertion of the check or coin into the device, after the wheel has been moved by hook 116 spring 191 returns wheel 153 to normal position as shown in Figure 1.

In close proximity to sidewall 10 is a washer 193 which is held frictionally against sidewall 10 by means of a nut 194 threadably secured on the bearing portion for the end of shaft 187, and this washer 193 has an inwardly projecting portion 196 thereon for the reception of the other end of torsion spring 191 so that by turning washer 193 and securing it in position by means of the nut 194, the tension of spring 191 can be adjusted to the proper condition.

A shaft 200 (Figure 1) is mounted in suitable bearings in the sidewalls 10 and 11 and fixedly mounted on this shaft is an arm 201, and surrounding this shaft is a torsion spring 202 which has one end thereof pressing against member 163, and the other end of this torsion spring is hooked over arm 201. The other end of arm 201 has pivotally secured therein a connecting rod 203. This rod 203 has a weight 204 thereon, and at one end thereof it projects upwardly and is pivotally connected at at 205 to a pivoted coin dump member 206 which is pivoted on a shaft 207 which is mounted between the sidewalls 10 and 11. The free end of member 206 projects upwardly and laterally and the lateral portion is indicated by reference character 208, which portion is adapted to occupy a position in the lower end of the coin receiving portion of the balancing mechanism to hold the coin therein while it is being weighed and measured.

Figure 5:
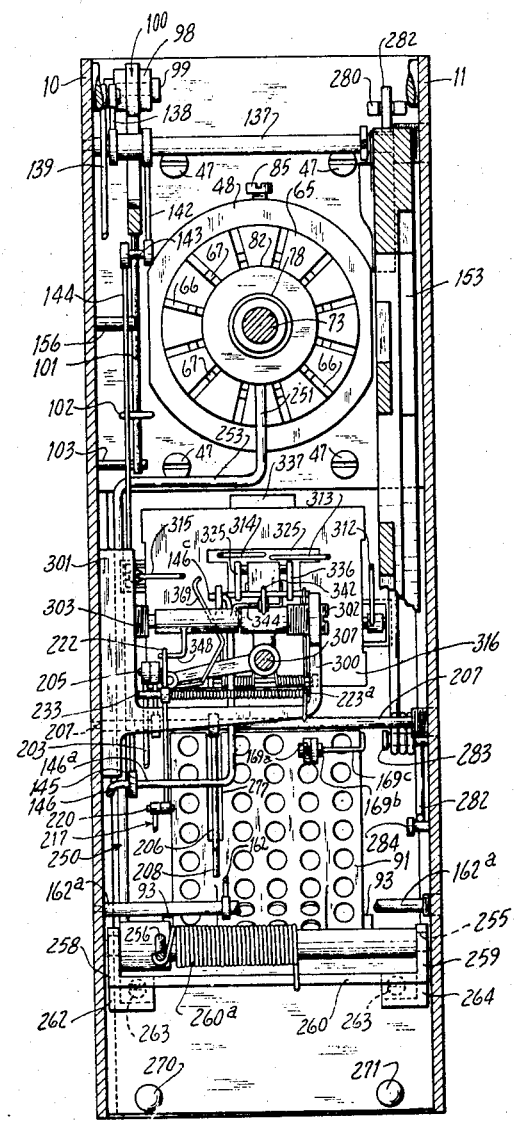
Figure 5 is a vertical cross sectional view taken along the line 5—5 in Figure 1.

The point of connection between arm 201 and 203 is in the form of a laterally disposed pin 209 which projects close to sidewall 10 and is limited in its forward movement toward the entrance of the casing by means of a fixed pin 210 which is mounted in sidewall 10. Secured in sidewall 10 is a member 215 which has a slot 216 (Figure 4) therein in which a shaft or elongated wire 217 is adapted to have sliding movement. This wire 217 has a downwardly projecting portion therein which forms a bend 218 therein and thus forms a shoulder 219, and after forming the shoulder, the member 217 projects forwardly and is pivoted as at 220 and is connected to feeler release mechanism lever 222 which is pivotally mounted as at 223 in a U-shaped bracket 224 which supports the balancing mechanism and which will be presently described. The upper end of member 222 has a hook 225 thereon adapted to engage arm 348 to hold the feeler members in the balancing mechanism from engaging the check as it enters the balancing mechanism and for holding the feelers away from the check when it is to be released from the beam. A spring 223a normally (Figure 5) holds member 222 and associated parts in the position shown in Figure 11.

Fixedly secured to sidewall 11 is a U-shaped bracket 230 which has laterally projecting portions 231 and 232, and in these laterally projecting portions is mounted a vertically disposed portion 233 which has at the bottom thereof a laterally projecting portion 234, and an upwardly projecting portion 235 which has a hook thereon adapted to penetrate a slot 236 in a stabilizer 237.

The upper end of member 233 comprises a laterally projecting portion 238 and a downwardly projecting portion 239 which has a hook 240 which pierces a slot 241 in stabilizer 237 for normally supporting the same in the position shown in the drawings. Stabilizer 237 projects upwardly beyond its point of support by hook 240 and has a slot 242 therein which is penetrated by a pin 243 projecting from the balancing mechanism which balancing mechanism will be later described.

Loosely mounted in groove 83 of member 82 (Figure 1) is an irregularly shaped member indicated by reference character 250. The portion 251 which is vertically disposed fits loosely in this groove 83 and then this member projects forwardly as at 252, and then laterally as at 253 and then downwardly as at 254, and then curves rearwardly and is fixedly mounted on shaft 255, and after passing point 255, the member 250 extends upwardly and rearwardly as at 256 and has the laterally projecting end 257. The shaft 255 on which member 250 is fixedly secured is rotatably mounted in upwardly projecting portions 258 and 259, and a torsion spring 260a surrounds shaft 255 and one end thereof is secured to the horizontally disposed portion 260, and the other end of this torsion spring is secured to member 250 as at 261.

A pin 250a is mounted in sidewall 11 and serves as a stop for member 250 to prevent it from pushing member 82 against the ends 67 of bell crank levers 62.

Projections 258 and 259 and the laterally disposed portion 260 are integral with arms 262 and 264 and these arms are secured to member 46 by any suitable means such as screws 263. The arm 262 is located on one side of the device, and arm 264 is located on the other side of the device which arms are connected together by portion 260.

Figure 3:
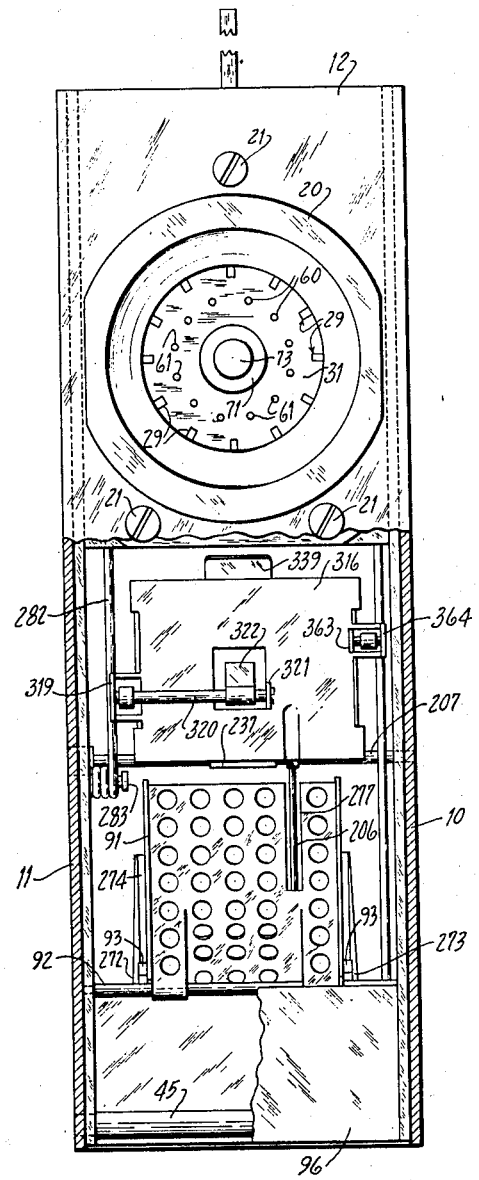
Figure 3 is a front elevation of the device with portions thereof broken away for clearness.

Member 46 has thereon the spaced heads 270 and 271 which are adapted to receive the flanges 272 and 273 of coin chute 274 (Figure 2), and this coin chute has a deflecting member 275 fixed therein. Also the member 274 has a slot 276 (Figure 4) in the upper end thereof adapted to allow movement of the lower end of member 206 therein, and also pivoted deflector member 91 has a slot 277 (Figure 3) therein for allowing movement of this member 206 in its upward and downward travel into association with the coin receiving portion of the balancing mechanism.

Near the upper rear surface of member 46 is a projection 280 (Figure 2) having a notch 281 (Figure 7) therein in which the upper end of a leaf spring 282 has lodgement, and this leaf spring 282 is twisted loosely around a pin 283 projecting from sidewall 11, and then the other end of this spring lodges above a pin 284 also projecting from sidewall 11, the purpose of this spring being to hold the member 46 and associated parts in normal position as shown in the drawings.

In some of the views the coin entrance is shown without any means for inserting the coin therein, and of course, it is understood that the pressure can be applied to the coin by the tip of the finger, but in other views I have shown means for pressing against the central portion of the coin so that equal pressure will be applied to all portions of the coin and not on one edge of the coin as might be done by pressing the coin with the finger. In this means, I have shown a pin 290 mounted in any suitable manner such as between the sidewalls 10 and 11, and pivotally secured on this pin is a member 291 which has a central portion 292 projecting upwardly therefrom with a member 293 secured thereto for receiving pressure from the hand of the operator, and the portion 292 projects inwardly as at 294 and has the downwardly projecting portion 295 which is adapted to lie flush against the face of the coin when the coin is inserted against the pins 60 in the entrance. In Figures 1 and 17 the above described mechanism is shown in inoperative position and ready to receive the check or coin into the entrance, and is held, in the position shown, by gravity causing the portion 295 to rest against a transversely disposed pin 296 which is secured to the member 25 and bridges the lower portion of entrance 31, and in this position the coin is inserted edgewise into the entrance, and the lower edge of the coin falls down against the lower edge of entrance 31 and then when pressure is applied to portion 293, the coin will be placed in proper position against the pins 60.

By referring to Figures 11 to 15 inclusive it is seen that member 224 has its end portion projecting upwardly as at 300, and the other end thereof has integral therewith a portion 301 which is secured to the sidewall 10 of the mechanism. The portions 300 and 301 have therein bearings 302 and 303, and these bearings 302 and 303 may have suitable jewels therein if desired to cause a fine balance to be imparted to the balancing mechanism.

Mounted in bearings 302 and 303 is a shaft 305 on which is fixedly secured a hub portion 306 which supports the rod 307 which forms the framework of the balancing mechanism. On one end of this member 307 is fixedly mounted a weight portion 308 which has a rectangular wire member 309 piercing the weight in two places forming openings 310 and 311.

Projecting from guard 309 is an extension 309a which is adapted to have movement in slot 126 in pivoted member 124.

Shaft 307 has a threaded portion 307a integral therewith on which is threadably secured a nut 307b which is a resilient nut commonly referred to as a split nut and therefore self-locking and will remain in adjusted position for adjusting the balance of the balancing mechanism.

The openings 310 and 311 form guideways for wires 312, 313, 314, and 315. The other end of member 307 has fixedly secured thereon a rectangular casing 316 which has a vertically disposed slot 317 therein for the reception of the check or coin for testing, not only the weight of the same, but also the relative thickness between its peripheral and central portions, and also for measuring the thickness of its central portion, and other mechanism is mounted in this portion 316 as will be presently described.

Secured in one of the sidewalls of the interior of casing 316 is a fixed projection 318. Projecting from the exterior of casing 316 is a lug 319 which has pivotally mounted therein a shaft 320 and to this shaft is fixedly secured rod 312. This shaft, at its other end, is pivotally mounted in a lug 321 extending from the exterior of casing 316, and fixedly secured on this shaft is a feeler member 322 which projects through a slot 323 in the sidewall of the casing most remote from member 307.

On the sidewall opposite from where shaft 320 is mounted, a cavity 325 occurs, and on opposite sides of this cavity and on the exterior of casing 316 are the projections 326 and 327, and fixedly secured in these lugs is a shaft 328 which has wound therearound in a loose manner, the portions 329 and 330 of a torsion spring whose central portion 331 passes over shaft 307, and the ends 332 and 333 of this torsion spring project upwardly and have mounted therein a shaft 334 which shaft penetrates lugs 335 and 336 which project through cavity 325. These lugs are part of a member 337 which is positioned on the inside of the casing 316. The upper end of this member 337 has a sloping portion 338 for directing coins or checks into the casing, and the opposite sidewall from where portion 337 occurs has an upwardly projecting portion 339 which has a sloping surface 340 thereon for likewise directing checks into the casing 316.

Surrounding shaft 334 is a tube 341 which has fixedly secured thereto a rod 342 which projects above shaft 307 and is pivotally connected as at 343 to an arm 344 which is integral with tube 345 loosely mounted on shaft 305, and also projecting from this tube 345 is an arm 348 which has a lateral projection 349 on the end thereof which is adapted to be engaged at times by hook 225 on member 222.

Also mounted in lugs 335 and 336 is a member 350 which is fixedly mounted on a shaft 351 which is loosely mounted in lugs 335 and 336, and this member 350 has a downwardly projecting lip 352 which is adapted at times to project against portion 353 of casing 316. Secured to the portion 350 is wire 313 which has been previously described.

Also mounted in lugs 335 and 336 is a shaft 355 which has pivotal mounting in these lugs, and secured on this shaft 355 is a feeler member 356, and integral with member 356 is rod 314 which has previously been described.

On the other side of casing from feeler 356 are three indentations indicated by reference characters 357, 358 and 359 which project into the interior of the casing 316 and against which the coin or check is adapted to be pressed by members 337 and 356.

Rotatably secured in sidewalls of casings 316 is a shaft 360 on which is fixedly secured a feeler member 361 which has its outer end secured to a wire 315. This wire 315 is pivotally mounted on shaft 362 which is mounted in lugs 363 and 364 extending from sidewall of casing 316. The purpose of this member 361 is to engage the side of the coin or check when it is in the casing 316.

Fixedly secured on shaft 307 is a bracket 365 which has rotatably secured in the free end thereof a shaft 366 which shaft is also rotatably mounted in casing 316 and projects across said casing, and on the inside of said casing a member 367 is mounted on the shaft 366, this member 367 normally engages the lower edge of the coin for holding it in the receptacle except when moved to a position to allow the coin to pass through casing 316. Surrounding this shaft 366 is a torsion spring 368 which has one end thereof secured in the sidewall of the casing, and the other end thereof, engages an arm 369 which arm is secured on shaft 366 and projects backwardly toward the pivot point of member 307 and then laterally and then upwardly and again laterally forming an abutment which swings in the path of rod 342. This member 369 projects inwardly toward shaft 307 and then upwardly above a portion of member 146 (see Fig. 1). This member 146 after leaving its pivotal point 145 projects inwardly and such part is designated by 146a (see Fig. 5) and then upwardly and has portion 146b (see Fig. 1) and then projects upwardly and has the laterally disposed portion 146c, and the portion 146b is adapted to raise member 369 from its normal position, which is that having its end resting on shaft 307, to an upward position against the force of torsion spring 368 to move the member 367 in a clock-wise direction as seen in Figure 15 so as to allow the coin or check to fall from the balancing mechanism and the feelers are withdrawn therefrom, which is caused by the portion 146c engaging arm 347 and moving the lateral projection 349 beneath the hook 225 which prevents the feelers from engaging the sides of the check or coin and thus the coin is allowed to drop out of the balancing mechanism for disposition either into the check controlled apparatus or to be rejected if it does not measure up to suitable requirements, both as to configuration, size, relative thickness between peripheral portions and central portion and weight.

In Figures 18 to 24 inclusive, I have shown different checks for purpose of illustration and explaining the operation of the device and the various features thereof. In Figure 18, the dotted line 375 indicates approximately the point at which the pins 60 would engage the surface of the genuine coin such as a five-cent piece of American money. It is there seen that some of the pins 60 will engage the raised portion of the coin such as portions of the Liberty head thereon, and these pins will be depressed to operate bell crank levers 62 while other of the pins 60 will coincide with sunken places on the face of the coin and will, therefore, not be operated and thus member 82 and portion 251 will be operated to release the deflector operating mechanism because some of the portions 67 of levers 62 will not be moved to clear member 82. In Figure 18 the genuine check is indicated by reference character 376.

In Figures 19 and 24 the central portion 377 will depress all of pins 60 and, therefore, members 82 and 250 will not be operated and the deflector operator 170 will not be allowed to move to operate the deflector 91. The pins will fall along the edge portion 378.

A check made in accordance with Figures 20 and 22 will fail to operate members 82 and 250 for the reason that the pins would engage this check along line 379 and all pins would be moved and, therefore, the check would be rejected. This check is indicated by reference character 381, while the check in Figure 19 is indicated by reference character 380.

In Figures 21 and 23 the check is indicated by reference character 382 and there it is seen that the imaginary circle 383 along which the pins 60 would approach the side of the check would fail to depress any of the pins and, therefore, members 82 and 250 would be operated by the relative measure apparatus between the peripheral and the central thickness located in the balancing beam and also the individual central thickness measuring means would cause the wires associated therewith to fail to register with the openings in member 176 on deflector operator 170 and also hook 166 would be released but deflector could not move forward.

It is thus seen that the combination between the entrance and the balancing mechanism provides a plurality of detecting devices for ejecting the check with regard to its measurements, and should unscrupulous persons understanding this mechanism endeavor to fashion a check which would successfully pass all of the measuring tests, it would be still impossible to provide a check which would successfully pass the measuring tests and also the weighing to which the check is subjected.

It might also be noted that while the check is being received into the balancing beam, said balancing beam is held in rigid position by means of pin 309a being in the smaller end of slot 126.

The method of operation of the mechanism is as follows:

When a check of proper size is inserted into the device, all of the dogs 29 are released from the path of plate 51, and plate 51 and all of the bell cranks 62 are moved in shell 48, and some of the bell cranks 62 not being moved far enough will engage flange 82, because they will not all be moved by the surface configuration of a genuine check. The dogs 29 being released, will allow shell member 65, plate 51 and all of the bell cranks 62 to move with member 46 on its pivot 45.

Member 104, pivoted at 99, will engage pin 124a by means of hook 108 and move member 124 to the right in Figure 1 and hook 107 will engage pin 107a in sidewall 11, being forced by spring 101 to hold member 46 in tilted position. Member 124 as it moves to the right in Figure 1 will, by means of slot 126 having pin 309a therein projecting from the balancing mechanism, bring the balancing mechanism to a level position.

Projection 127 on member 124 will engage pin 209 and move rod 217 upwardly and pin 209 will ride into fork 129 and will lodge behind portion 219. This movement of pin 209 will cause movement of member 206 on pivot 207 to move portion 208 into the coin receiving portion 316 of balancing mechanism to a point where a falling coin as it enters the balancing mechanism will engage 208 before striking the coin support and will break the dead center position of 205. It might be added that while pivot 205 is on a dead center with pivots 207 and 209 that it is held in this position by weight 204. The impact of the falling check causes 208 to assume the position shown in Figure 1 and allows pin 209 to move forwardly, which pushes rod 217 and releases hook 225 to allow feelers 356 and 337 to engage the side of the coin.

At the time the coin is inserted into the entrance and member 65 is moved with relation to member 82, some of the bell cranks 67 will engage flange 82, and member 250, pivoted at 255, and loosely fitting in groove 83, will have its upper end 251 moved to the right in Figure 1 and this will depress portion 257 to cause it to engage rod 162, pivoted at 162a to cause it to move downwardly into the notch near portion 164 to release end portion of 162 from the path of dog 166 and allow member 175, which is the deflector operating means, to move to the left in Figure 1, provided the measuring devices in the balancing mechanism properly position stop wires 312 to 315 inclusive, and also provided the check is of proper weight to cause pin 243 to coincide with slot 181 in member 176. If stop wires 312 to 315 are properly positioned by the check they will coincide with the holes 179 and 180, see Figure 4, in vane 176.

When the parts are moved as above described, connecting rod 139 is pulled by member 124 to cause arm 142, pivoted to arm 144, to move arm 144, pivoted at 145 on member 146, which member is in turn pivoted at 147, to move it downwardly to depress rod 342 to withdraw feelers 337 and 356 from the path of the falling check while it enters the balancing mechanism and causes arm 348 to become engaged with hook 225 to hold the feelers away from the check until the check falls and hits 208 when it enters the balancing mechanism, which releases pin 209 as above described.

When member 124 is swung to the right by the insertion of a check, dog 116 engages lower edge of vane 190 on wheel 153 so that wheel 153 must be partially rotated to retard the operation of the mechanism to give the balancing mechanism time to measure the check and to become balanced after being released by movement of member 124 releasing the pin in slot 126.

The rotation of wheel 153 causes pin 152 to engage arm 142 to break the pivot from its dead line center to allow it to move to the position shown in Figure 1, and this allows member 146 to move upwardly and its transverse portion 146c engages member 369 to partially rotate shaft 366 to move coin support 367 (Figure 14) from the path of the coin and the feelers 337 and 356 being released from pressing on the check by upward movement of member 146c will allow the check to fall from the balancing mechanism.

It is, of course, evident, that if the surface configuration of the check be smooth as in the case of a slug, and it operates all of the bell cranks 67, then member 82 will not be moved except by member 65, and therefore, member 250 will not be moved far enough to engage rod 162 to move it downwardly to cause its end portion to fail to engage dog 166, and end of 162 engaging dog 166 and this will hold member 175 to remain in the position shown in Figure 1 and deflector 91 will remain in position to return the checks to the exterior of the device. Even if the surface configuration of the check cause movement of 82 to release hook 166, if the measurements taken by the feelers in the balancing mechanism do not properly position wires 312 to 315, or if the weight of the coin is not correct, then wires 312 to 315 or pin 243 will engage the vane 176 and the deflector 91 cannot be moved to deflect the checks into the apparatus.

In closed position, pin 103 in sidewall 11 holds hook 107 out of engagement with pin 107a, but when member 46 is swung on its pivot by the opening of the entrance, then spring 101 is relieved from engagement with pin 103 and this causes spring 101 to move to closed end of loop 102 and causes hook 107 to move downwardly behind pin 107a. As pressure is relieved from the coin in the entrance it falls downwardly, then member 46 swings to close the entrance and pin 103 engages spring 101 and kicks projection 107 out of engagement with pin 107a.

In the drawings and specification, there has been set forth a preferred embodiment of the invention and although specific terms are employed, they are used in a generic and descriptive sense only and not for purposes of limitation, the scope of the invention being set forth in the appended claims:

1. In a check or coin tester and the like, a balancing beam weighing the check and means contained in the balancing beam for subjecting the check to a plurality of measuring tests while the same is being weighed, and means controlled independently by the balancing beam and the measuring means for disposing of said check after it leaves the balancing beam.

2. In a check testing device, a balancing beam for weighing the check and means in the balancing beam for measuring the check during the weighing operation, and means controlled independently by the balancing beam and the measuring means for disposing of said check after it leaves the balancing beam.

3. In a fraud preventive device for check controlled apparatus, a balancing beam, means for conducting a check to the balancing beam, means for gripping the check in the beam for testing the check, means for supporting the gripping means to receive the check, and means for successively removing the supporting means from beneath the check and releasing the gripping means to allow the check to fall from the beam, and deflector means controlled by the balancing beam and the gripping means.

4. In a fraud preventive device for check controlled apparatus having a suitable entrance and a balancing mechanism, means for directing the check from the entrance to the balancing mechanism having therein means for measuring the thickness of the central portion of the check, means for measuring the thickness of the peripheral portion of the check, means for measuring the diameter of the check and means controlled by said measuring means for determining the disposition of the check after it is released from the balancing mechanism and means for releasing the check from the balancing mechanism.

5. In a fraud preventive device for check controlled apparatus having an entrance for a check and also having a balancing mechanism, means for directing the check from said entrance to said balancing mechanism, means for measuring the peripheral thickness of the check means for measuring the diameter of the check, and means controlled independently by each of said measuring means for determining the disposition of the check, and means for releasing said check from said balancing mechanism.

6. In a check controlled apparatus having a plurality of testing means for a check, comprising means for testing the configuration of the side of a check, means for measuring the thickness of a check near its edge, diameter testing means, and means controlled by all of said means for disposing of the check.

7. In a fraud preventive device for check controlled apparatus having a balancing beam and an entrance for the check and means for directing the check from the entrance to the balancing beam, means in said balancing beam for measuring the thickness of the central portion of the check, means in said balancing beam for measuring the peripheral thickness of the check, means in said balancing beam for measuring the diameter of the check, means for holding the check in said balancing beam during the weighing and measuring operations and for releasing the check therefrom, and means controlled independently by each of said measuring means for disposing of the check in one of two directions after it has been released from the balancing beam.

8. In a fraud preventive device for check controlled apparatus having a balancing beam and means for directing a check to said balancing beam, a deflector and operating means therefor, means in said balancing beam for measuring the thickness of the central portion of the check and the peripheral thickness of the check and the circumference and the diameter of the check and means connected to each of said measuring means for independently controlling the deflector operating means for determining whether the deflector operating means shall be operated.

9. In a fraud preventive device for check controlled apparatus, means for measuring the thickness of the peripheral portion of a check means for measuring the diameter of the check, means for measuring the deviation from a plane surface of the side surface of the check, means for measuring the thickness of the central portion of the check and means operable by at least some of said measuring means for determining the course to be traveled by the check after being subjected to all of said measuring means.

10. In a fraud preventive device for check controlled apparatus, having an entrance, means for normally closing said entrance, means operable by pressure exerted on a check for opening said entrance, means operable by the side surface of the check, a balancing beam, a deflector and operating means therefor, means connected with said closing means and having operable engagement with said deflector operating means, means for receiving a check in said balancing beam, means for measuring the thickness of the central portion of the check, means for measuring the thickness of the peripheral portion of the check, means for measuring the diameter of the check and means associated with said measuring means and having operable engagement with said deflector operating means for controlling the movement of said deflector operating means.

11. In a fraud preventive device for check controlled apparatus having a check entrance and means for normally closing said entrance and locking the same in closed position, means operable by pressure on an inserted check of a given circularity and of a given diameter and of a given thickness for allowing the closing means to be moved to open position by pressure on an inserted check, a balancing beam having means therein for receiving the check after it passes through the entrance, a plurality of testing means for the check in said balancing means comprising weight determining means, central thickness determining means, peripheral thickness determining means, diameter determining means, and means operable by said weight determining means and thickness determining means for determining the disposition of the check after it is released from the balancing mechanism, and means for releasing said check from the balancing mechanism.

12. In a fraud preventive device for check controlled apparatus having an entrance normally closed and means operable by pressure on an inserted check for moving the entrance to open position, means for directing the check after it passes through the entrance, a balancing mechanism adapted to receive the check and to weigh the same, means for gauging the central thickness and peripheral thickness and diameter of the check while it is in the balancing mechanism, means for releasing the check from the balancing mechanism and means operable by said gauges for determining the disposition of the check after it passes out of the balancing mechanism.

13. In a fraud preventive device for check controlled apparatus a check entrance and means for normally closing said entrance, means operable by an inserted check for allowing pressure on the inserted check to move the closing means to open position, a weighing means, means for directing the check to the weighing means, measuring means adapted to press against the check while it is in the weighing means, and deflector means operable by said measuring means for directing the check into or out of the check controlled apparatus after it leaves the weighing means.

14. In a fraud preventive for check controlled apparatus having an entrance and means for holding said entrance in normally closed position, means associated with said entrance and operable by an inserted check of a given peripheral thickness and of a given circular circumference for allowing the closing means to be moved to open position by pressure on the inserted check, a balancing mechanism, a deflector, deflector operating means, thickness reading means for the central portion of the check in the balancing mechanism, means in the balancing mechanism for measuring the peripheral thickness of the check, means in the balancing mechanism for testing the diameter of the check, surface configuration reading means in said entrance and having operable connection with the deflector operating means, means associated with all of said reading means in the balancing mechanism and having operable relation to the deflector operating means to control said deflector operating means.

15. In a fraud preventive device for check controlled apparatus having a check entrance, means for normally closing said entrance, means for locking said entrance normally in closed position, means operable by a check having peripheral thickness and a circular circumference within given limits for unlocking said means for locking the entrance in closed position and allowing the closing means to be moved by pressure on an inserted check to open position, means for retarding the return of the closing means to closed position, surface configuration reading means in said closing means adapted to have engagement with a plurality of points of the side surface of the inserted check, means for magnifying the configuration readings, a balancing mechanism adapted to receive the check after it passes through the entrance, a deflector operating means, means operable by the opening of closing means for the entrance for locking the deflector operating means in one position, means operable by a surface configuration reading means in the entrance for releasing said locking means for the deflector operating means, means for measuring the thickness of the central portion of the check after it passes into the balancing beam, means for measuring the peripheral thickness of the check after it passes into the balancing beam, means for measuring the circumference of the check after it passes into the balancing beam, and means associated with all of said measuring means in the balancing mechanism and having operable engagement with the deflector operating means to allow the deflector operating means to operate only when a check has properly positioned all of said thickness and circumference measuring means in the balancing means.

AARON A. KNEE.